United States Patent
Graefe

(10) Patent No.: US 10,489,386 B2
(45) Date of Patent: Nov. 26, 2019

(54) MANAGING TRANSACTIONS REQUESTING NON-EXISTING INDEX KEYS IN DATABASE SYSTEMS

(71) Applicant: Google Inc., Mountain View, CA (US)

(72) Inventor: Goetz Graefe, Madison, WI (US)

(73) Assignee: Google LLC, Mountain View, CA (US)

( * ) Notice: Subject to any disclaimer, the term of this patent is extended or adjusted under 35 U.S.C. 154(b) by 15 days.

(21) Appl. No.: 15/405,841

(22) Filed: Jan. 13, 2017

(65) Prior Publication Data
US 2018/0165326 A1    Jun. 14, 2018

Related U.S. Application Data

(60) Provisional application No. 62/433,944, filed on Dec. 14, 2016.

(51) Int. Cl.
G06F 16/22     (2019.01)
G06F 16/23     (2019.01)
G06F 16/245    (2019.01)

(52) U.S. Cl.
CPC ...... G06F 16/2379 (2019.01); G06F 16/2246 (2019.01); G06F 16/2343 (2019.01); G06F 16/245 (2019.01)

(58) Field of Classification Search
CPC ......... G06F 17/30377; G06F 17/30424; G06F 17/30327; G06F 17/30362; G06F 16/2379; G06F 16/2343; G06F 16/245; G06F 16/2246
See application file for complete search history.

(56) References Cited

U.S. PATENT DOCUMENTS

| | | | |
|---|---|---|---|
| 5,440,732 A | 8/1995 | Lomet et al. | |
| 5,555,388 A | 9/1996 | Shaughnessy | |
| 5,832,484 A * | 11/1998 | Sankaran | G06F 17/30362 |
| 6,105,026 A | 8/2000 | Kruglikov et al. | |
| 6,115,703 A | 9/2000 | Bireley et al. | |
| 6,606,626 B1 | 8/2003 | Ponnekanti | |
| 6,944,615 B2 | 9/2005 | Teng et al. | |

(Continued)

FOREIGN PATENT DOCUMENTS

| | | |
|---|---|---|
| CN | 103218445 A | 7/2013 |
| EP | 1 566 751 B1 | 8/2005 |

OTHER PUBLICATIONS

International Search Report and Written Opinion for PCT/US2017/066383 dated Mar. 9, 2018.

(Continued)

*Primary Examiner* — Jorge A Casanova
(74) *Attorney, Agent, or Firm* — Foley & Lardner LLP

(57) ABSTRACT

This disclosure provides systems, methods, and apparatus for managing locks for non-existing keys in an index of a database. The system can receive a first transaction for accessing a first requested key that does not match any of a plurality of keys in the index. The system partitions the first requested key using a partitioning function to a first partition. The system can also receive a second transaction for accessing a second requested key that does not match any of the plurality of keys in the index. The system also partitions the second requested key using the partitioning function to a second partition. The system assigns locks to the second transaction only if the second partition is distinct from the first partition.

18 Claims, 8 Drawing Sheets

(56) References Cited

U.S. PATENT DOCUMENTS

| | | |
|---|---|---|
| 7,174,331 B1 | 2/2007 | Luo et al. |
| 8,086,579 B1 | 12/2011 | Chandrasekaran et al. |
| 8,176,023 B2 | 5/2012 | Graefe |
| 9,542,439 B1 | 1/2017 | Cohen et al. |
| 2002/0065974 A1 | 5/2002 | Thompson |
| 2003/0033285 A1 | 2/2003 | Jalali et al. |
| 2008/0086470 A1 | 4/2008 | Graefe |
| 2014/0040220 A1 | 2/2014 | Kimura et al. |

OTHER PUBLICATIONS

Non-Final Office Action on U.S. Appl. No. 15/405846 dated Dec. 26, 2018.
International Preliminary Report on Patentability for Appl. Ser. No. PCT/US2017/066383 dated Jun. 27, 2019 (7 pages).
Lehman et al., "Efficient Locking for Concurrent Operations on B-Trees", ACM Transactions on Database Systems, vol. 6., No. 4, Dec. 1981, pp. 650-670.
U.S. Final Office Action for U.S. Appl. No. 15/405,846 dated Jun. 17, 2019 (9 pages).

\* cited by examiner

200

| Employee ID | First Name | Postal Code | Phone |
|---|---|---|---|
| 80 | Gary | 10032 | 1122 |
| 90 | Jerry | 46045 | 9999 |
| 93 | Mary | 53704 | 5347 |
| 95 | Jerry | 37745 | 5432 |
| 97 | Terry | 60061 | 9999 |

| First Name | Count | Employee ID |
|---|---|---|
| Gary | 1 | 80 |
| Jerry | 2 | 90, 95 |
| Mary | 1 | 93 |
| Terry | 1 | 97 |

| Phone | Count | Employee ID |
|---|---|---|
| 1122 | 1 | 80 |
| 5347 | 1 | 93 |
| 5432 | 1 | 95 |
| 9999 | 2 | 90, 97 |

Figure 2C

MANAGING TRANSACTIONS REQUESTING NON-EXISTING INDEX KEYS IN DATABASE SYSTEMS

CROSS REFERENCE TO RELATED PATENT APPLICATIONS

This application claims priority to U.S. Provisional Patent Application Ser. No. 62/433,944, filed Dec. 14, 2016, entitled "SYSTEMS AND METHODS FOR ASSIGNING LOCKS IN DATABASES," which is incorporated by reference herein in its entirety.

TECHNICAL FIELD

This disclosure relates to the field of database systems, and in particular transactional database systems including indexes.

DESCRIPTION OF THE RELATED TECHNOLOGY

Database management systems can store, process, and secure data in a database. Database read and write transactions are directed to the database management system, which processes the transactions and performs tasks on the database to execute the received transactions. In some implementations, to maintain concurrency, the database management system may issue locks to the received transactions for locking portions of the database that the transactions need to access. If a portion of the database requested by a transaction is already locked, the transaction is halted until the lock becomes available. Once the transaction is complete, the portion of the database is unlocked. In some implementations, the database can be indexed having a plurality of keys and records associated with each of the plurality of keys. Transactions received by the system may query or update one or more records associated with one or more keys of the plurality of keys of the index.

SUMMARY

According to one aspect, the subject matter described in this disclosure relates to a database management system including a memory having an index including a plurality of keys and at least one record associated with each of the plurality of keys. The system further includes a controller communicably coupled to the memory, where the controller is configured to receive a first transaction for accessing a first requested key that does not match any of the plurality of keys. The controller is further configured to determine a first key from the plurality of keys, wherein a value of the first key is nearest to and is one of lesser than and greater than a value of the first requested key. The controller is also configured to use a k-partition function to assign the first requested key a first partition out of k-partitions, and issue a first lock to the first transaction for the first partition. The controller is further configured to receive a second transaction for accessing a second requested key that does not match any of the plurality of keys, wherein a value of the second requested key has a same less than or greater than relationship with the value of the first key as the value of the first requested key does with the value of the first key. The controller is also configured to use the k-partition function to assign the second requested key a second partition out of the k-partitions. The controller is additionally configured to issue a second lock to the second transaction for the second partition based on a determination that the second partition is distinct from the first partition.

According to another aspect, the subject matter described in this disclosure relates to a method for managing transactions for accessing a database. The method includes receiving a first transaction for accessing an index including a plurality of keys and at least one record associated with each of the plurality of keys, wherein the first transaction requests access to a first requested key that does not match any of the plurality of keys. The method further includes determining a first key from the plurality of keys, wherein a value of the first key is nearest to and is one of lesser than and greater than a value of the first requested key. The method also includes assigning, using a k-partition function, a first partition out of k-partitions to the first requested key, and issuing a first lock to the first transaction for the first partition. The method additionally includes receiving a second transaction for accessing a second requested key that does not match any of the plurality of keys of the index, wherein a value of the second requested key has a same less than or greater than relationship with the value of the first key as the value of the first requested key does with the value of the first key. The method further includes assigning, using the k-partition function, a second partition out of the k-partitions to the second requested key. The method also includes issuing a second lock to the second transaction for the second partition based on a determination that the second partition is distinct from the first partition.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIGS. 2A-2C show representations of example primary and secondary indexes.

Like reference numbers and designations in the various drawings indicate like elements.

DETAILED DESCRIPTION

The various concepts introduced above and discussed in greater detail below may be implemented in any of numerous ways, as the described concepts are not limited to any particular manner of implementation. Examples of specific implementations and applications are provided primarily for illustrative purposes.

Figure 1:
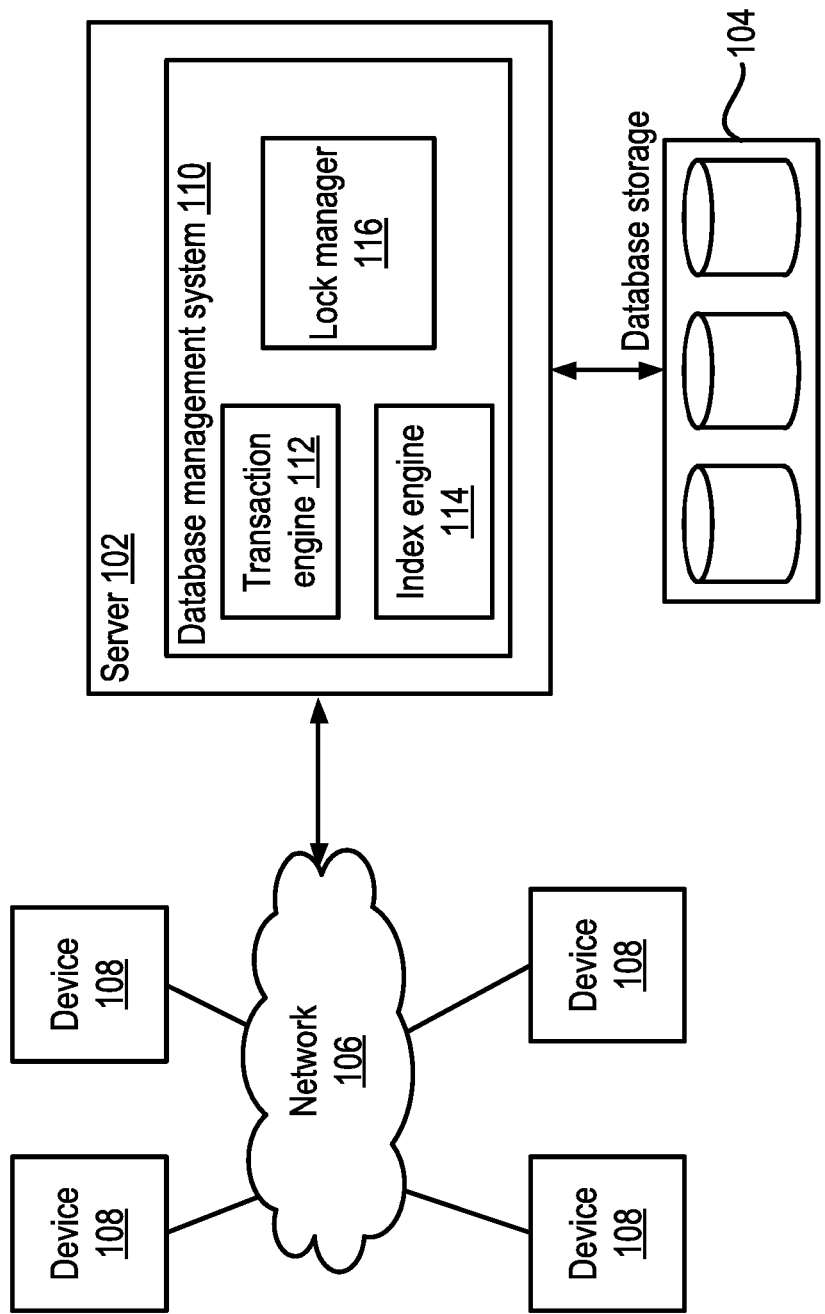
FIG. 1 shows a representation of an example computing system.

FIG. 1 shows a representation of an example computing system 100. The system 100 includes a server 102, a database storage 104, a network 106, and devices 108. The server 102 hosts a database management system 110, which, in turn, includes a transaction engine 112, an index engine 114, and a lock manager 116. The database storage 104 includes one or more storage volumes 118, which can include physical storage such as magnetic disk storage, solid state storage, and the like.

The devices 108 can include any computing devices that can communicate over a network, such as the network 106. In some implementations, the devices 108 can include desktop computers, laptop computers, tablet computers, mobile communication devices, mainframe computers, servers, and the like. In some implementations, the devices 108 can provide a user interface to one or more users to allow the user to provide input, receive output, and generally interact with one or more applications running on the devices 108. In some implementations, the devices 108 can include one or more applications that allow the device 108 to communicate with other computing devices, such as the server 102, over the network 106. For example, in some implementations the devices 108 can run applications such as client applications that allow the user or other applications running on the devices 108 to communicate with the server 102 and the database management system 110. The devices 108 also may run server applications that can allow other client applications running on other devices to communicate with the devices 108.

The network 106 can include a wireless network and/or a wired network. In some implementations, the network 106 can include the Internet, an intranet, or any other network technology that can allow communications between the devices 108 and between the devices 108 and the server 102.

The server 102 can be include any computing device that can communicate over the network 106. In some implementations, the server 102 can include devices similar to those discussed above in relation to implementing the devices 108. The server 102 can also communicate with the database storage 104 via a network and/or a peripheral interface. The server 102 can run an operating system (not shown) which facilitates running on one or more applications, such as the database management system 110. The database management system 110 can allow one or more users to access a database concurrently. Further the database management system 110 can store, process, and secure data in the database. In some implementations, the database can be stored in the database storage 104, which can be internal and/or external to the server 102. In some implementations, the database storage 104 can be local to the server 102, distributed across a network, or any combination thereof. A user can be user and/or an application that interacts with the database management system 110 by way of the devices 108 or by way of the server 102. The user can access the database by sending requests to the database management system 110. The requests can be in the form of queries in a query language specified by the database management system 110, such as, for example, a structured query language (SQL). The database management system 110 also can communicate results of processing the requests back to the users.

The database management system 110 may split the requests sent by the users into tasks and sub-tasks. In some implementations, these tasks and sub-tasks can be assigned to server 102 threads. The transaction engine 112 can process the requests to generate memory transactions to execute the requests. For example, the transaction engine 112 can generate memory read and/or write transactions corresponding to requests such as queries and updates received from the users. In some embodiments, these transactions may read and/or modify database tables and indexes related to the database. The index engine 114 manages one or more database tables and indexes of the database management system 110. In particular, the index engine 114 can manipulate elements of the database table and indexes in response to transactions generated by the transaction engine 112. The lock manager 116 provides shared and exclusive locks for client threads that need to perform protected operations to the data stored in the database. The lock manager 116 also can provide additional locks or lock modes such as increment locks, intention locks.

FIG. 2A shows a representation of an example primary index 200 corresponding to a database table, FIG. 2B shows a representation of an example first secondary index 202, and FIG. 2C shows a representation of an example second secondary index 204. The primary index 200 includes several records, namely: Employee ID, First Name, Postal Code, and Phone. One of these records, the Employee ID, serves as primary key. The values of the primary key are unique, and the primary index 200 is sorted according to the primary key values. In some implementations, the primary index 200 may not include values for all the records, and instead include pointers corresponding to each primary key value, where the pointer points to a location in a database table or a data file where the values of the records are stored. In this example, the primary key (Employee ID) can be used to perform searches in the primary index 200.

The first secondary index 202 and the second secondary index 204 are non-unique indexes that are arranged with respect to non-unique attributes of the primary index 200. For example, the first secondary index 202 is arranged with respect to the First Name record (also referred to as "on First Name") while the second secondary index 204 is arranged with respect to the Phone record (also referred to as "on Phone"). Generally, secondary indexes facilitate query-answering on attributes other than the primary key. Here, the first secondary index 202 facilitates query answering on First Name, and the second secondary index 204 facilitates query answering on Phone. Thus, a query to the first secondary index 202 on a First Name value "Jerry" would return two primary key values 90 and 95, which can be used to access the records that correspond to employees with the First Name "Jerry." Similarly, a query to the second secondary index 204 on a Phone value 9999 would return the primary key values 90and 97, which can be used to access the records of the employee with the phone number 9999. In some implementations, queries to the secondary indexes can be combined to provide records for a multi-attribute search. For example, to search for employee records of one or more employees with First Name "Jerry" and having a Phone number "9999," an intersection (90) of the result set (90 and 95) of the query to the first secondary index 202 and the result set (90, 97) of the query to the second secondary index 204 can be determined to obtain the appropriate primary key (or keys) in the primary index 200. Additional secondary indexes on other attributes of the primary index 200 also can be formed. In some implementations, the number of entries in primary and secondary indexes can be different from the ones shown in FIGS. 2A-2C. For example, in some implementations, the number of entries, especially for large databases, can run into hundreds, thousands, or hundreds of thousands. The discussion herein is not limited by the size of the indexes.

Figure 3:
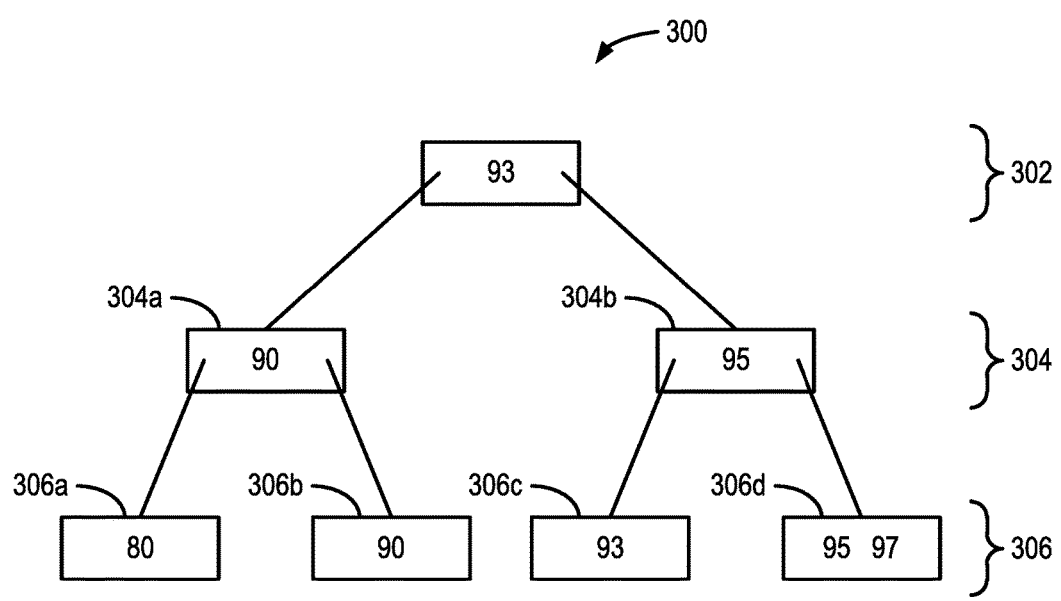
FIG. 3 illustrates a b-tree index corresponding to the primary index shown in FIG. 2A.

FIG. 3 illustrates a b-tree index 300 corresponding to the primary index 200 shown in FIG. 2A. The b-tree index is an example data structure for representing the primary index 200. The b-tree index includes a root node 302, a set of intermediate nodes 304 and a set of leaf nodes 306. Each node in the b-tree index 300 includes at least one search key value and at least two pointers pointing to children nodes or to records. For example the root node 302 includes one search key 93 and two pointers: a left pointer pointing to a first intermediate node 304a and a right pointer pointing to a second intermediate node 304b. The b-tree index 300 is structured such that all the nodes in the portion of the tree reached via the left pointer have search key values that are less than the search key value 93 in the root node 302, and all the nodes in the portion of the tree reached via the right pointer have search key values that are greater than or equal to the search key value 93 of the root node 302. Similarly the first intermediate node 304a includes a search key value 90, and two pointers that point to the first leaf node 306a, having a search key 80, which is less than the search key value 90, and a second leaf node 306b having a search key value 90, which is greater than or equal to the search key value. Further, the second intermediate node 304b includes a search key value 95, and includes a pointer pointing to a third leaf node 306c having a search key value 93 and another pointer pointing to a fourth leaf node 306d having two search key values 95 and 97.

Each of the leaf nodes can include or point to records (or columns) associated with their respective search keys. For example, the first leaf node 306a includes or points to records associated with the Employee ID (or primary index key) 80 in the primary index 200 (FIG. 2A). Similarly, fourth leaf node 306d includes or points to records associated with the Employee ID 95 and the Employee ID 97. The search keys in the leaf nodes 306 are sorted in an increasing order from left to right. In some implementations, one leaf node may include a pointer to the leaf node to its immediate right.

It is understood that the b-tree index 300 shown in FIG. 3 is only one example b-tree representation of the primary index 200, and that other configurations of b-trees or other index data structures could be used to represent the primary index 200. B-tree indexes, similar to the b-tree index 300, also can be used to represent the first secondary index 202 and the second secondary index 204.

The b-tree representations of indexes, such as the primary index 200 and the secondary indexes 202 and 204 can provide an efficient tool for searching and manipulating the indexes. In some implementations, the index engine 114 can manage the b-tree indexes by receiving operations from the transaction engine 112 to read or modify the b-tree indexes. However, the techniques for issuing locks to transactions requesting non-existing index keys discussed herein are not limited to particular representations of indexes, and can be applied to any index and any representation thereof.

As mentioned above in relation to FIG. 1, the lock manager 116 provides locks such as shared, exclusive, increment, intention, and the like, for transactions that need to perform protected operations on the data stored in the database. In some implementations, a requesting transaction acquires a lock from the lock manager 116 to a row that the transaction needs to access or update. The row can be exclusively locked for that transaction for the duration of the execution of the transaction. If the lock to the row has already been acquired by a different transaction, then the requesting transaction waits to acquire the lock until after the execution of the different transaction is completed and the lock associated with the row is again unlocked.

Transactions can include, for example, query and update transactions. Query transactions include searching indexes, such as secondary and primary indexes, with an index key. Update transactions modify, add, or delete records within indexes, such as secondary and primary indexes. Both query and update transactions may operate on multiple indexes. For example, a query transaction may first query one or more secondary indexes to obtain a set of primary index keys, which, or a subset of which, may be used to access records in the primary index. An update transaction may update a record on the primary index, and also related records in one or more secondary indexes. Upon receiving a query or an update transaction, the transaction engine 112 can schedule one or more operations on the one or more indexes. In addition, the transaction engine 112 may request locks from the lock manager 116 for each of the one or more operations. If the locks are received, the transaction engine 112 may proceed with the operations by coordinating with the index engine 114. Once the transaction is complete, the transaction engine 112 notifies the lock manager 116 to unlock or release the locks associated with the transaction. In some implementations, the lock manager 116 may not unlock the locks granted for the transaction until the transaction is fully completed. Thus, if the rows of indexes for which locks have been requested have been previously locked by other transactions that are still being executed, the lock manager 116 may not grant the locks. In such situations, the transaction engine 112 may halt the transaction, and wait for the other transactions to be completed and for the lock manager 116 to unlock the associated locks.

In some implementations, the transactions may request or update data that may not yet exist in the index. For example, a query operation may request to read records associated with a primary index key #84 in the primary index 200 or the b-tree index 300. However, the primary index key #84 does not exist in the primary index. Thus, the query transaction would be unsuccessful, or may produce an empty result. However, to maintain serializability and repeatable count, it is desirable to prevent entry of a record with the primary index key #84 by another transaction before the query transaction is completed. Similar entries into secondary indexes (such as the ones shown in FIGS. 2B-2C) also need to be prevented to maintain serializability and repeatable count. In some implementations, the entry can be prevented by assigning locks.

Figure 4:
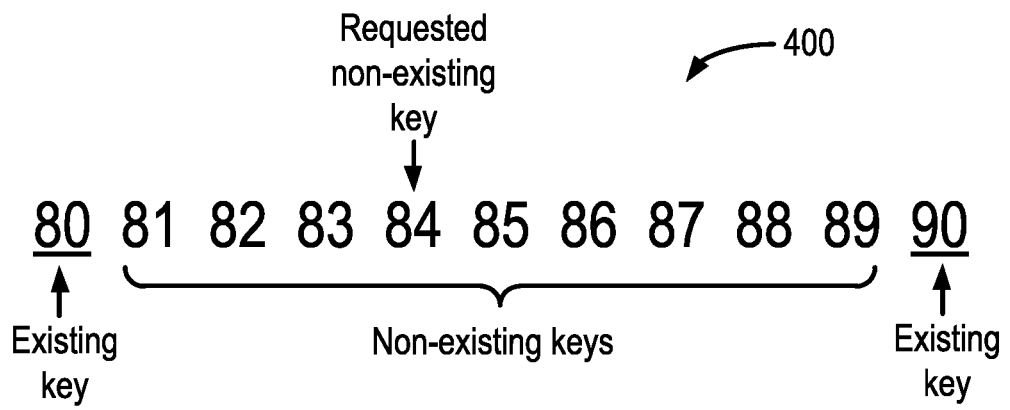
FIG. 4 shows a list of non-existent index key values between two existing keys within which a requested index key lies.

In some implementations, as the requested index key is non-existent, the lock manager 116 may be assign locks to an entire range of non-existent index keys between two key entries that are greater than and less than the requested index key. For example, FIG. 4 shows a list of non-existent index key values between two existing keys within which a requested index key lies. In particular, FIG. 4 shows a list 400 of index key values between an existing primary index key #80 and another existing primary index key #90. The query transaction, discussed above, requests reading records associated with a non-existent primary key #84. In some implementations, locks to the entire range of the non-existent primary index keys (or secondary index keys if the query transaction requests a non-existent secondary index key) between two existent primary index keys that are greater than and less than the requested non-existent primary index key #84 may be granted. However, this approach can cause performance delays, because transactions requesting a non-existing primary index keys other than #84 but that lies within the locked range of #81-#89 would not be able to proceed. In other words, in the above approach, not only those transactions that request the non-existent primary index key #84 are blocked, but also those transactions that request non-existent primary index keys with values other than #84 but within the range #81-#89 are blocked. This can affect the performance of the database.

Figure 5:
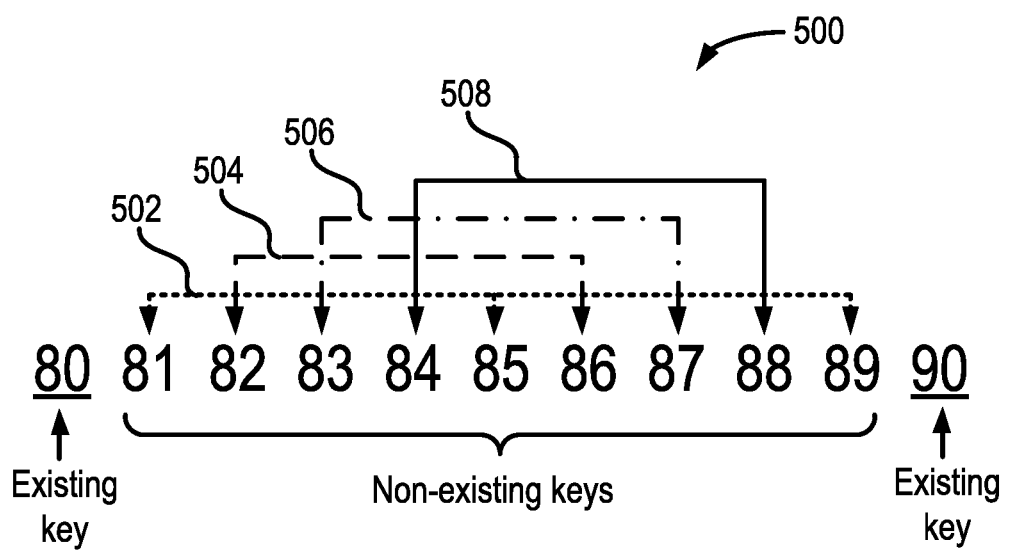
FIG. 5 depicts a result of a partitioning locking technique.

FIG. 5 depicts a result of a partitioning locking technique. In particular, FIG. 5 shows list 500 of non-existent primary index key values between two existing primary index key values #80 and #90, similar to the list 400 shown in FIG. 4. However, rather than locking the entire range of non-existent primary index keys between #80 and #90, the lock manager 116 partitions the list into k partitions, and provides locks to one or more of the k partitions. Specifically, the list 500 of non-existent primary index keys are divided into four partitions: a first partition 502 including keys #81, #85, and #89; a second partition 504 including keys #82 and #86; a third partition 506 including keys #83 and #87; and a fourth partition 508 including keys #84 and #88. The lock manager 116 then grants locks to only the fourth partition 508, which includes the requested non-existing primary index key #84. Thus, access to keys #84 and #88 is blocked until the transaction is completed. However, the remaining keys within the list 500 are not locked. That is, access to keys within the first, second, and third partitions 502, 504, and 506, is allowed while the current transaction retains the lock for the fourth partition. Therefore, if another transaction requesting the non-existing primary index key #86 is received before the transaction which requested access to key #84 is completed, the lock manager 116 can assign the locks to the second partition 504, which includes keys #82 and #86. This reduces the number of transactions that may be blocked, thereby improving the performance of the database management system 110.

In FIG. 5 the four partitions were formed by using a modulo-k function on the range of non-existent primary index keys. Specifically, the four partitions are generated by the a modulo-4 function. However, this approach of forming partitions is only an example, as other modulo functions, or other techniques for forming partitions, also may be used. For example a hash function that maps the non-existing index key to one of k partitions also can be used. In some implementations, the sizes of the partitions may be fixed, and the fixed number of partitions can be formed such that all of the non-existent primary index keys are included in one of these partitions. In some implementation, the size of the partitions can be selected based on the desired level of granularity. That is, the number of partitions can be increased to provide a fine granularity of locking. For example, a modulo-8 function, instead of the modulo-4 function could be utilized to increase the number of partitions, resulting in an even further reduction in the number of transaction that may have to be blocked.

In some implementations, a transaction may include a range predicate. That is, the transaction requests access to a range of non-existent index keys. In such instances, all the partitions that include the non-existent index keys within the requested range can be locked. For example, if the range predicate of a transaction includes keys #82-84, the second partition 504, the third partition 506, and the fourth partition 508 can be locked. However, the first partition 502 remains unlocked, transactions requesting index keys within the first partition 502 can be allowed to proceed and acquire locks to the first partition.

Figure 6:
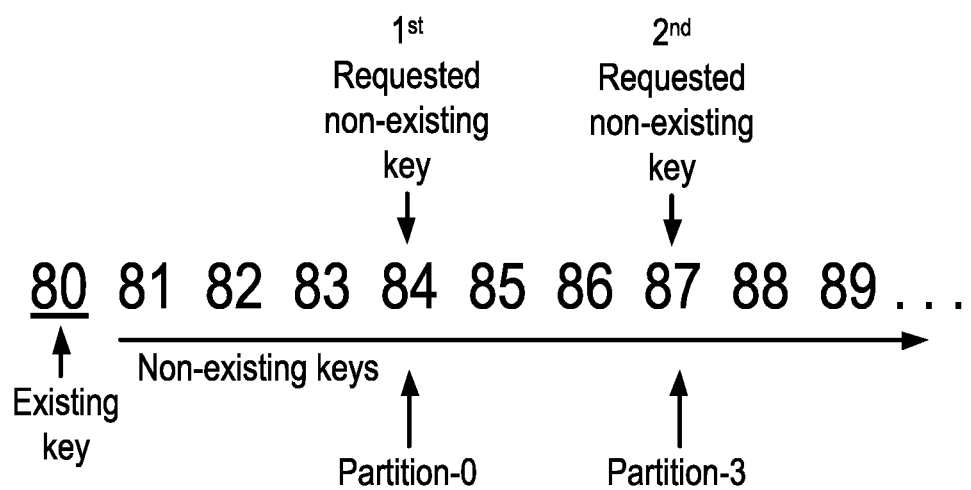
FIG. 6 shows another partitioning technique for partitioning requested non-existing index keys.

FIG. 6 depicts another approach to partitioning non-existing keys. In this approach, the lock manager 116 determines the nearest existing key that is either greater than or less than the value of the requested non-existing key. In the example shown in FIG. 6, a first transaction requests an index key #84 in the primary index. The lock manager 116 determines whether the requested key exists in the primary index by comparing the requested index key with the primary keys in the primary index. If there is no match with any existing primary keys in the primary index, the lock manager 116 can determine that the requested index key #84 is a non-existent key. However, unlike the technique discussed above in relation to FIG. 5, in which the lock manager 116 determines two nearest existing index keys #80 and #90 between which the requested index key #84 lies, the lock manager 116 determines only one of a nearest lower and a nearest greater existing index key to the requested index key #84. In the example, shown in FIG. 6, the lock manager selects the index key #80, which is the nearest to and lesser in value than the requested index key #84. Alternatively, the lock manager 116 can select the index key #90, which is nearest to and greater in value than the requested non-existent index key #84.

The lock manager 116 can use a partitioning function to assign the requested non-existing index key into a partition. For example, the lock manager 116 can use a modulo-k function to assign the requested non-existent key #84 to one of k partitions. In some examples, the lock manager 116 can use a hash function that maps the non-existing index key to one of k partitions. Referring to the example shown in FIG. 6, the lock manager 116 can use the modulo-4 function as a partition function and assign the non-existing key #84 to one of 4 partitions. The result of a modulo-4 function on the key value 84 is 0. Therefore, the lock manager assigns the first partition: Partition-0, to the first non-existing key #84. The lock manager 116 can issue the requesting transaction a lock to the non-existing key #84 or to the Partition-0 assigned to the non-existing key #84.

The lock manager 116 can receive a second request for an index key #87 in the primary index. The lock manager 116, as discussed above in relation to the first request, can determine whether the requested key #87 is a non-existing key. The lock manager 116 can also determine the nearest existing key in the index that is either greater than or less than the value of the second requested non-existing key #87. In some implementations, the lock manager 116 can maintain a consistent policy for selecting a nearest existing key that is either greater than or less than the requested non-existing key. For example, the lock manager 116 can always select the nearest existing key that is lesser in value than the requested non-existing key. In other examples, the lock manager 116 can always select the nearest existing key that is greater in value than the requested non-existing key. In the example shown in FIG. 6, the lock manager 116 always selects the nearest existing key that is lesser than the requested non-existing key. Thus, for the second non-existing key, similar to the that for the first non-existing key, the lock manager 116 selects the existing key #80.

The lock manager 116 uses the same partitioning function, which was used to assign a partition to the first requested non-existing key #84, to assign a partition to the second requested non-existing key #87. For example, the lock manager 116 uses the modulo-4 function to determine the partition that can be assigned to the second requested non-existing key #87. The result of the modulo-4 function applied to the key value #87 results in 3. Therefore, the lock manager 116 assigns Partition-3 to the second requested non-existing key.

The lock manager 116 determines whether the partition assigned to the second requested key #87, has been previously been locked for a different transaction. In this case, the Partition-0 has been locked for the first transaction requesting the first non-existing key #84. But the Partition-3, which has been assigned to the second requested non-existing key #87 has not been locked by a previous transaction. Therefore, the lock manager 116 can issues to the second transaction a lock to the second non-existing key #87 or the Partition-3.

If the lock manager 116 receives another transaction that requests a non-existing key that is greater than the existing key #80 and falls into either Partition-0 or Partition-3, then the request for that non-existing key would be denied. For example, if another transaction were to request the non-existing key #83, the modulo-4 of which would result in an assignment of Partition-3, that request to the non-existing key #83 would be denied because the lock to the Partition-3 has been issued to the second transaction. In such cases, the transaction can be halted and issued locks after the locks for the requested key and partition become available.

The example shown in FIG. 6 can be particularly useful in cases where the requested non-existing key is less than the smallest key value in the index or greater than the greatest key value in the index. For example, if #80 were the greatest key in an ordered index, then there are infinite number of possible non-existing keys that have a value that is greater than the index key #80. In such instances, the lock manager 116 assigns one of k partitions based on the partition function used on each requested non-existing key that has a value that is greater than #80.

It should be noted that locks granted for the non-existing keys having values greater than the existing index key #80 do not affect requests for locks to non-existing index keys that have values less than the existing index key #80. The lock manager 116 can manage the locking of non-existing keys having values less than the existing index key #80 separately and independently from managing the locking of non-existing keys having values greater than the existing index key #80.

In one or more implementations, the lock manager 116 can manage the locks to all non-existing index keys, regardless of their values relative to existing index keys, as a single group. For example, when a request for any non-existing key is received, the lock manager 116 can use the modulo-k function, or any other partitioning function, to assign a partition to that non-existing key. When a request for another non-existing key is received, the lock manager 116 uses the same partitioning function to determine the partition assigned to the another non-existing key, and if the partition has been locked by a previous transaction, the lock manager may deny the request for the another non-existing key.

In some implementations, the lock manager 116 can specify lock modes for acquiring locks to non-existent keys. In some such implementations, the lock manager 116 can specify and maintain k+1 lock modes, which includes k lock modes corresponding to the k partitions, and an additional lock mode that locks the entire range of non-existing keys between two existing keys. In some implementations, the lock manager 116 can define lock modes by combining exclusive ("X"), shared ("S"), and no-lock ("N") modes. Exclusive locks are typically assigned to write or update transactions and are not compatible with any other lock. Shared locks are typically assigned to read or query transactions, and can share the lock with other transactions. In one example, a transaction may request a lock mode "NNNNS" for the partitions shown in FIG. 5. This means that the transaction is requesting no-locks for the first, second, third, and fourth partitions 502, 504, 506, and 508, and is requesting a shared lock for the entire range of non-existing keys between keys #80 and #90. In another example, one transaction may request a lock mode "NNNXN" to lock the fourth partition including the key #84, and a second transaction may request a lock mode "NXNNN" to lock the second partition. As the requested locks do not overlap, both these transaction may be granted the requested locks and allowed to proceed. Similar lock mode requests can be used for the four partitions discussed above in relation to FIG. 6. The lock manager 116 can select the next existing key #90 to define a range of non-existing keys between keys #80 and #90, and assign a range lock to that range of keys. The lock manager 116 can define lock modes by combining lock modes in addition to those mentioned above, such as, for example, incremental lock modes and intentional lock modes.

Figure 7:
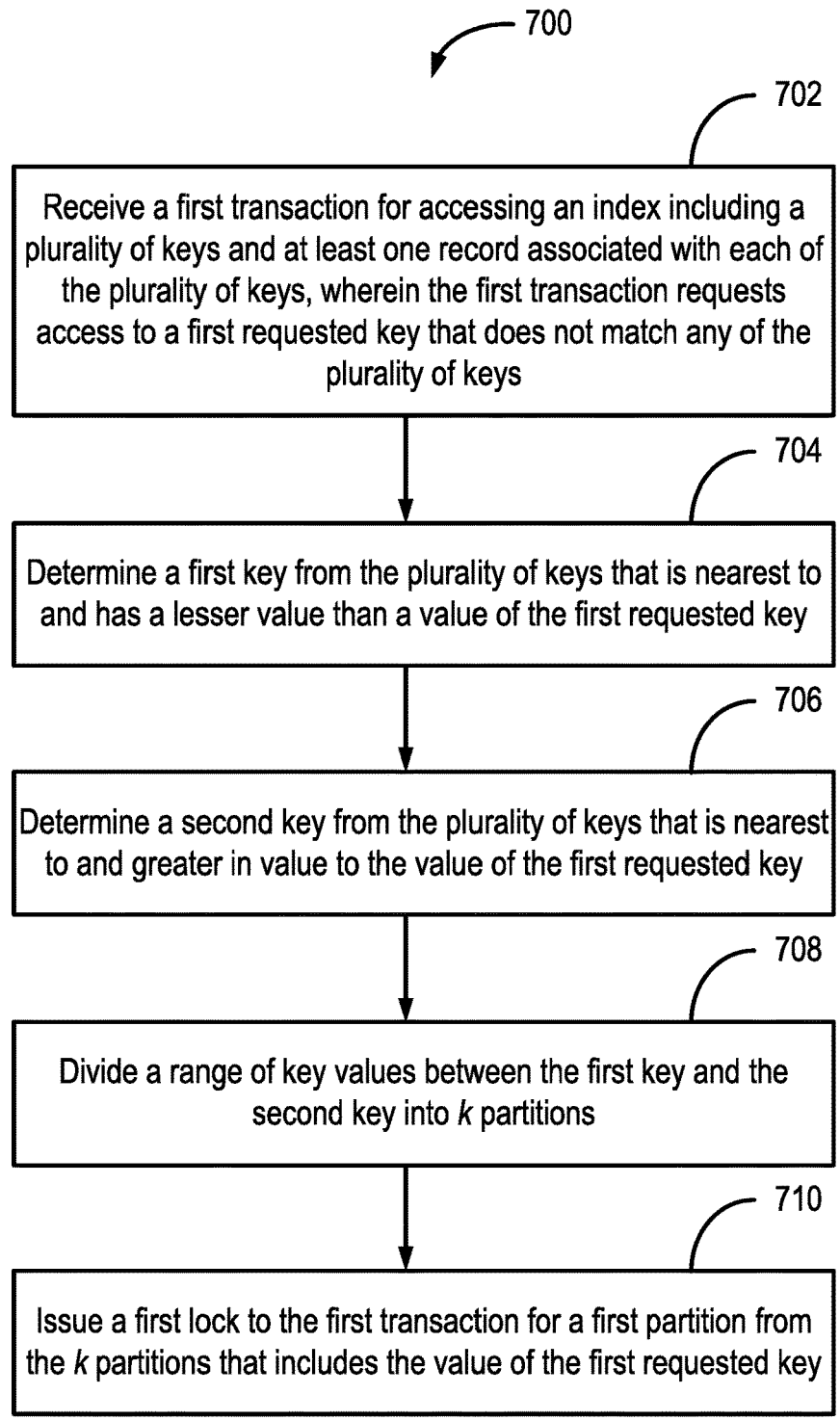
FIG. 7 shows a flow chart of an example process for handling incoming transactions at the database management system shown in FIG. 1.

FIG. 7 shows a flow chart of an example process 700 for handling incoming transactions at the database management system 110 shown in FIG. 1. In particular, the process 700 includes receiving a first transaction for accessing an index including a plurality of keys and at least one record associated with each of the plurality of keys, where the first transaction requests access to a first requested key that does not match any of the plurality of keys (stage 702). One example of this process stage has been discussed above in relation to FIGS. 2A-5. In particular, FIG. 4 shows a requested key #84, associated with a received transaction, that does not match any of the plurality of keys within the primary index 200 shown in FIG. 2A.

The method further includes determining a first key from the plurality of keys that is nearest to and has a lesser value than a value of the first requested key (stage 704), and determining a second key from the plurality of keys that is nearest to and greater in value to the value of the first requested key (stage 706). Examples of these process stages have been discussed above in relation to FIG. 5. For example, as shown in FIG. 5, the lock manager 116 determines an existing primary index key #80, which is nearest to, and less than, the requested key #84, and determines an existing primary index key #90, which is nearest to, and greater than, the requested key #84.

The method also includes dividing a range of key values between the first key and the second key into k partitions (stage 708). One example of this process stage has been discussed above in relation to FIG. 5. For example, as shown in FIG. 5, the lock manager 116 divides the range #81-#89 into four partitions: a first partition 502, a second partition 504, a third partition 506, and a fourth partition 508.

The method further includes issuing a first lock to the first transaction for a first partition from the k partitions that includes the value of the first requested key (stage 710). One example of this process stage has been discussed above in relation to FIG. 5. For example, the lock manager 116 grants a lock to the fourth partition 508, which includes the requested key #84.

Figure 8:
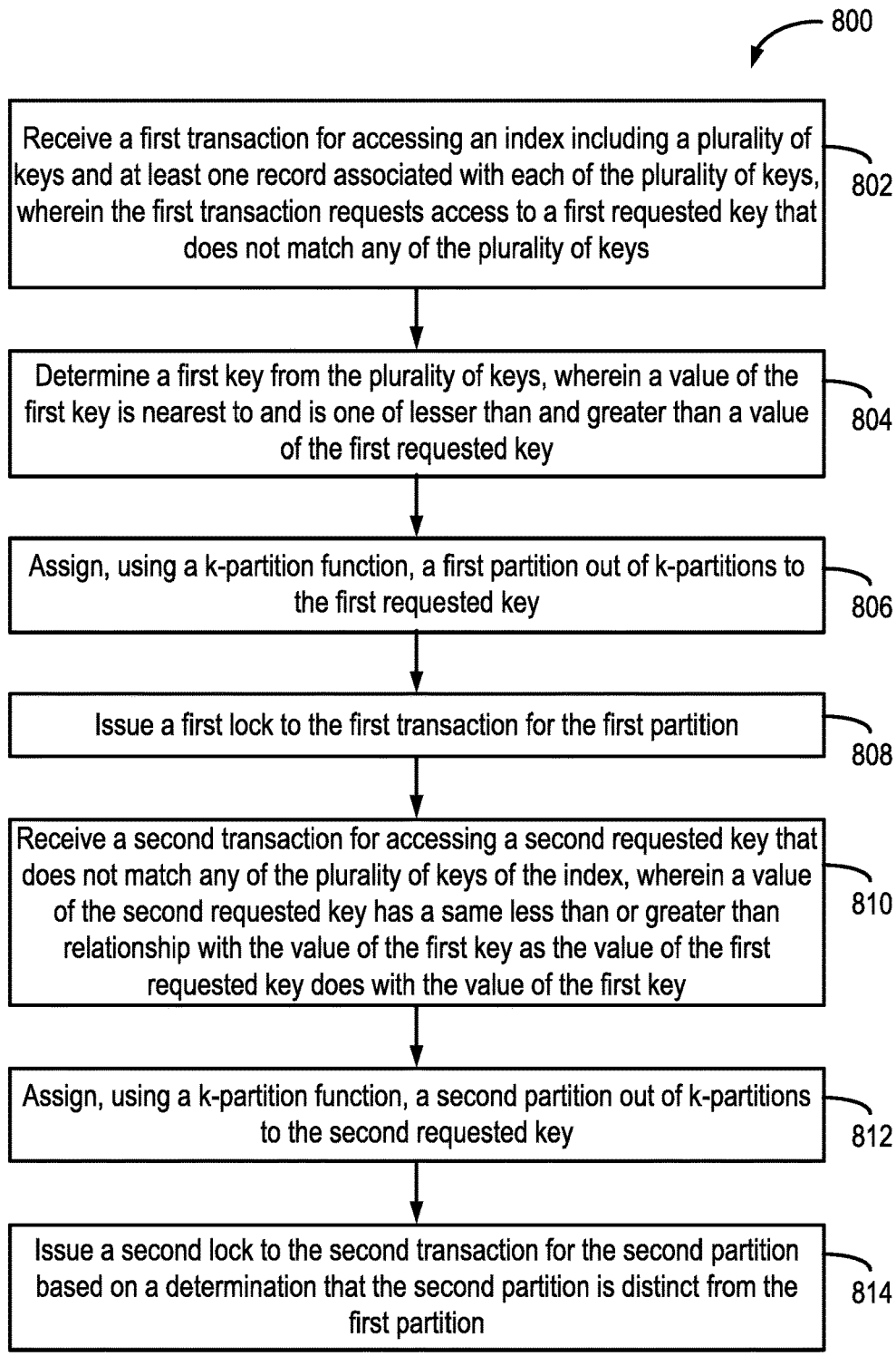
FIG. 8 shows a flow chart of another example process for handling incoming transactions at the database management system shown in FIG. 1.

FIG. 8 shows a flow chart of another example process 800 for handling incoming transactions at the database management system 110 shown in FIG. 1. The process 800 includes receiving a first transaction for accessing an index including a plurality of keys and at least one record associated with each of the plurality of keys, wherein the first transaction requests access to a first requested key that does not match any of the plurality of keys (stage 802). One example of this process stage has been discussed above in relation to FIGS. 2A-6. In particular, FIGS. 4 and 6 show a requested key #84, associated with a received transaction, that does not match any of the plurality of keys within the primary index 200 shown in FIG. 2A.

The method further includes determining a first key from the plurality of keys, wherein a value of the first key is nearest to and is one of lesser than and greater than a value of the first requested key (stage 804). One example of this process stage has been discussed above in relation to FIG. 6. For example, lock manager 116 selects the existing index key #80, which is nearest to and has a value that is less than the value fo the first requested key #84. As mentioned above in relation to FIG. 6, the lock manager 116 may select the existing key #90, which is nearest to and has a value that is greater than the value of the first requested key #84.

The process 800 further includes assigning, using a k-partition function, a first partition out of k-partitions to the first requested key (stage 806). One example of this process stage has been discussed above in relation to FIG. 6. For example, the lock manager 116 uses a modulo-4 function on the value of the requested non-existing key #84, and assigns a Partition-0, which is one of four partitions, to the first requested key #84. The process 800 also includes issuing a first lock to the first transaction for the first partition (stage 808). As discussed above in relation to FIG. 6, the lock manager issues a lock to the requested non-existing key #84 or to the Partition-0 assigned to the requested non-existing key #84.

The process 800 also includes receiving a second transaction for accessing a second requested key that does not match any of the plurality of keys of the index, wherein a value of the second requested key has a same less than or greater than relationship with the value of the first key as the value of the first requested key does with the value of the first key (stage 810). One example of this process stage has been discussed above in relation to FIG. 6. For example, a second transaction requests a second non-existing index key #87. The value of the second non-existing index key #87 is also greater than the value of the existing index key #80. That is, the second requested non-existing key #87 is on the same side of the existing key #80 as the first requested non-existing key #84. Thus, the value second non-existing key #87 has the same "greater than" relationship with the value of the existing key #80 as the "greater than" relationship of the value of the first non-existing key #84 has with the value of the existing key #80. It should be noted that even if the existing key #90 were to be selected as the first key, the value of the second existing key #87 would have the same "less than" relationship with the value of the existing key #90 as the "less than" relationship of the value of the first requested non-existing key #84 does with the value of the existing key #90.

The process 800 further includes assigning, using the k-partition function, a second partition out of the k-partitions to the second requested key (stage 812). One example of this process stage has been discussed above in relation to FIG. 6. The lock manager 116 uses the same partitioning function to assign a partition to the second requested non-existing key that was used to assign a partition to the first requested non-existing key #84. That is, the lock manager 116 uses the modulo-4 function on the value of the second requested non-existing key #87 to assign Partition-3 to the second requested non-existing key #87.

The process 800 also includes issuing a second lock to the second transaction for the second partition based on a determination that the second partition is distinct from the first partition (stage 814). One example of this process stage has been discussed above in relation to FIG. 6. The lock manager 116 determines whether the partition (Partition-3) assigned to the second requested non-existing key #87 is distinct from the partition (Partition-0) assigned to the first requested non-existing key #84. As the assigned partitions are distinct, the lock manager 116 issues a lock to the second transaction for the second requested non-existing key #87 or the Partition-3.

Figure 9:
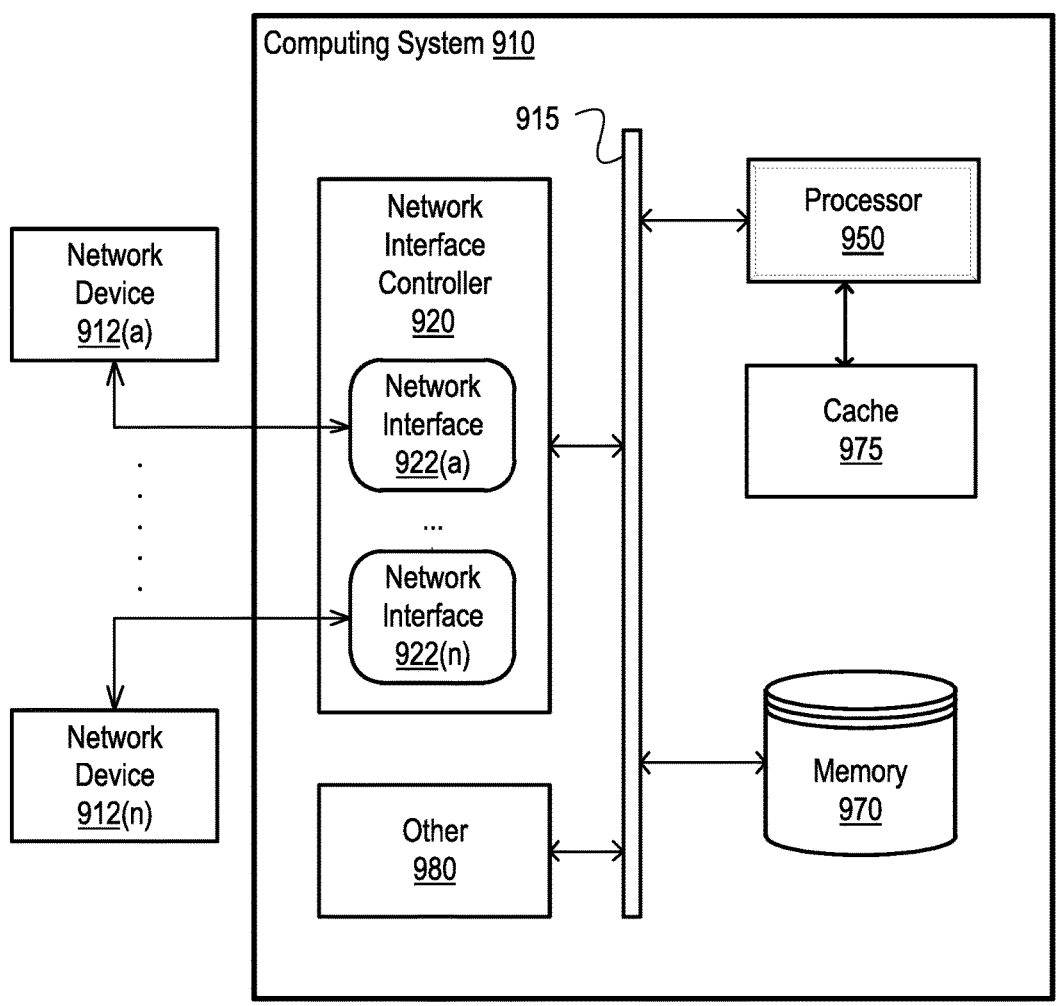
FIG. 9 shows a representation of another example computing system.

FIG. 9 shows a block diagram of an example computing system 910. In some implementations, the computing system 910 may be utilized in implementing the various components shown in the example server 102 shown in FIG. 1. In some implementations, the computing system 910 can be utilized for implementing one or more modules of the database management system 110. In some implementations, the computing system 910 can be utilized to implement the database storage 104. In some implementations, one or more computing systems 910 can be utilized to execute one or more stages of the process 700 shown in FIG. 7 and the process 800 shown in FIG. 8.

In broad overview, the computing system 910 includes at least one processor 950 for performing actions in accordance with instructions and one or more memory devices 970 or 975 for storing instructions and data. The illustrated example computing system 910 includes one or more processors 950 in communication, via a bus 915, with at least one network interface controller 920 with network interface ports 922(*a-n*) connecting to other network devices 912(*a-n*), memory 970, and any other devices 980, e.g., an I/O interface. Generally, a processor 950 will execute instructions received from memory. The processor 950 illustrated incorporates, or is directly connected to, cache memory 975.

In more detail, the processor 950 may be any logic circuitry that processes instructions, e.g., instructions fetched from the memory 970 or cache 975. In many embodiments, the processor 950 is a microprocessor unit or special purpose processor. The computing system 910 may be based on any processor, or set of processors, capable of operating as described herein. In some implementations, the processor 950 can be capable of executing the process 600 shown in FIG. 6. The processor 950 may be a single core or multi-core processor. The processor 950 may be multiple processors. In some implementations, the processor 950 can be configured to run multi-threaded operations.

The memory 970 may be any device suitable for storing computer readable data. The memory 970 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, and Blu-Ray® discs). A computing system 910 may have any number of memory devices 970. In some implementations, the memory 970 can include instructions corresponding to the process 600 shown in FIG. 6. In some implementations, the memory 970 may store one or more database indexes such as the indexes shown in FIGS. 2A-2C.

The cache memory 975 is generally a form of computer memory placed in close proximity to the processor 950 for fast read times. In some implementations, the cache memory 975 is part of, or on the same chip as, the processor 950. In some implementations, there are multiple levels of cache 975, e.g., L2 and L3 cache layers.

The network interface controller 920 manages data exchanges via the network interfaces 922(*a-n*) (also referred to as network interface ports). The network interface controller 920 handles the physical and data link layers of the open system interconnection (OSI) model for network communication. In some implementations, some of the network interface controller's tasks are handled by the processor 950. In some implementations, the network interface controller 920 is part of the processor 950. In some implementations, a computing system 910 has multiple network interface controllers 920. The network interfaces 922(*a-n*) are connection points for physical network links. In some implementations, the network interface controller 920 supports wireless network connections and an interface port is a wireless receiver/transmitter. Generally, a computing system 910 exchanges data with other network devices 912(*a-n*) via physical or wireless links to a network interfaces 922(*a-n*). In some implementations, the network interface controller 920 implements a network protocol such as Ethernet.

The other network devices 912(*a-n*) are connected to the computing system 910 via a network interface port 922. The other network devices 912(*a-n*) may be peer computing devices, network devices, or any other computing device with network functionality. For example, a first network device 912(*a*) may be a network device such as a hub, a bridge, a switch, or a router, connecting the computing system 910 to a data network such as the Internet.

The other devices 980 may include an I/O interface, external serial device ports, and any additional co-processors. For example, a computing system 910 may include an interface (e.g., a universal serial bus (USB) interface) for connecting input devices (e.g., a keyboard, microphone, mouse, or other pointing device), output devices (e.g., video display, speaker, or printer), or additional memory devices (e.g., portable flash drive or external media drive). In some implementations, a computing system 910 includes an additional device 980 such as a co-processor, e.g., a math co-processor can assist the processor 950 with high precision or complex calculations.

In some implementation, the other devices 980 can include global positioning and geo-fencing modules, that can allow generating and processing of global positioning data associated with the computing system 910.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

The operations described in this specification can be implemented as operations performed by a data processing apparatus on data stored on one or more computer-readable storage devices or received from other sources.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network. Examples of communication networks include a local area network ("LAN") and a wide area network ("WAN"), an inter-network (e.g., the Internet), and peer-to-peer networks (e.g., ad hoc peer-to-peer networks).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A database management system, comprising:
a memory including:
an index including a plurality of keys and at least one record associated with each of the plurality of keys; and
a controller communicably coupled to the memory, configured to:
receive a first database transaction for accessing a first requested key that does not match any of the plurality of keys;
determine a first key from the plurality of keys, wherein a value of the first key is nearest to and is either lesser than or greater than a value of the first requested key;
use a k-partition function to assign the first requested key a first partition out of k-partitions, the k-partition function configured to cause each partition of a pair of partitions of the k-partitions to be assigned to a respective key of a pair of keys that does not match any of the plurality of keys, each of the respective keys having a respective value between the value of the first key and a value of another key of the plurality of keys that is preceding or subsequent to the first key in the plurality of keys;
issue a first lock to the first database transaction for the first partition;
receive, prior to completion of the first database transaction, a second database transaction for accessing a second requested key that does not match any of the plurality of keys, wherein a value of the second requested key has a same less than or greater than relationship with the value of the first key as the value of the first requested key does with the value of the first key;
use the k-partition function to assign the second requested key a second partition out of the k-partitions; and
issue a second lock to the second database transaction for the second partition based on a determination that the second partition is distinct from the first partition.

2. The database management system of claim 1, wherein the k-partition function includes a modulo-k function.

3. The database management system of claim 1, wherein the k-partition function includes a hash function that can map its input to one of k-partitions.

4. The database management system of claim 1, wherein the index is a primary index.

5. The database management system of claim 1, wherein the index is a secondary index formed based on an attribute of a primary index.

6. The database management system of claim 1, wherein the controller is further configured to determine a second key from the plurality of keys, the second key having a value that is nearest to and greater than the value of the first key, and to maintain a range lock for a range of key values between the first key and the second key.

7. The database management system of claim 1, wherein the first lock is a shared lock.

8. The database management system of claim 1, wherein the first lock is an exclusive lock.

9. The database management system of claim 1, wherein the controller is configured to receive the first transaction for accessing at least one more key in addition to the first requested key, and issue one or more locks in addition to the first lock for one or more of the k-partitions that include the at least one more key.

10. A method for managing transactions for accessing a database, comprising:
receiving a first database transaction for accessing an index including a plurality of keys and at least one record associated with each of the plurality of keys, wherein the first database transaction requests access to a first requested key that does not match any of the plurality of keys,
determining a first key from the plurality of keys, wherein a value of the first key is nearest to and is either lesser than or greater than a value of the first requested key;
assigning, using a k-partition function, a first partition out of k-partitions to the first requested key, the k-partition function configured to cause each partition of a pair of partitions of the k-partitions to be assigned to a respective key of a pair of keys that does not match any of the plurality of keys, each of the respective keys having a respective value between the value of the first key and a value of another key of the plurality of keys that is preceding or subsequent to the first key in the plurality of keys;
issuing a first lock to the first database transaction for the first partition;
receiving, prior to completion of the first database transaction, a second database transaction for accessing a second requested key that does not match any of the plurality of keys of the index, wherein a value of the second requested key has a same less than or greater than relationship with the value of the first key as the value of the first requested key does with the value of the first key;
assigning, using the k-partition function, a second partition out of the k-partitions to the second requested key; and
issuing a second lock to the second database transaction for the second partition based on a determination that the second partition is distinct from the first partition.

11. The method of claim 10, wherein the k-partition function includes a modulo-k function.

12. The method of claim 10, wherein the k-partition function includes a hash function that can map its input to one of k-partitions.

13. The method of claim 10, wherein the index is a primary index.

14. The method of claim 10, wherein the index is a secondary index formed based on an attribute of a primary index.

15. The method of claim 10, further comprising determining a second key from the plurality of keys, the second key having a value that is nearest to and greater than the value of the first key, and maintaining a range lock for a range of key values between the first key and the second key.

16. The method of claim 10, wherein the first lock is a shared lock.

17. The method of claim 10, wherein the first lock is an exclusive lock.

18. The method of claim 10, wherein the first transaction requests access to at least one more key in addition to the first requested key, and wherein the method further includes issuing one or more locks in addition to the first lock for one or more of the k partitions that include the at least one more key.

* * * * *